(12) United States Patent
Oldani

(10) Patent No.: US 6,428,252 B1
(45) Date of Patent: Aug. 6, 2002

(54) METHOD FOR MACHINING

(76) Inventor: Tino Oldani, 628 Calvin Park Blvd., Rockford, IL (US) 61107

( * ) Notice: Subject to any disclaimer, the term of this patent is extended or adjusted under 35 U.S.C. 154(b) by 0 days.

(21) Appl. No.: 08/832,486

(22) Filed: Apr. 2, 1997

(51) Int. Cl.⁷ ................................................ B23C 9/00
(52) U.S. Cl. .................. 409/132; 318/570; 318/573; 409/80; 700/183; 700/172; 700/187
(58) Field of Search ............................... 409/131, 132, 409/84, 79, 191, 10, 80, 99, 102; 364/474.02, 474.34; 144/48.1, 365, 356; 700/188, 173, 196, 187, 119, 193, 163; 318/572, 573, 569, 579; 312/571–573

(56) References Cited

U.S. PATENT DOCUMENTS

| 3,595,130 A | * | 7/1971 | Maker .......................... 409/10 |
| 3,641,872 A | * | 2/1972 | Ulfhelm ....................... 409/80 |
| 3,665,493 A | * | 5/1972 | Glowzewski et al. ... 318/571 X |
| 3,677,136 A | * | 7/1972 | Girola ......................... 409/102 |
| 3,784,798 A | * | 1/1974 | Beadle et al. ............... 700/173 |
| 4,227,842 A | * | 10/1980 | Samantha et al. .......... 409/131 |
| 4,268,949 A | * | 5/1981 | Sato .......................... 409/99 X |
| 4,445,182 A | * | 4/1984 | Morita et al. ........... 318/572 X |
| 4,533,286 A | * | 8/1985 | Kishi et al. ............. 364/474.34 |
| 4,535,408 A | * | 8/1985 | Kishi et al. .............. 318/579 X |
| 4,591,989 A | * | 5/1986 | Tanaka ....................... 700/176 |
| 4,620,281 A | * | 10/1986 | Thompson ................. 700/176 |
| 4,648,761 A | * | 3/1987 | Mitchell et al. ............ 409/132 |
| 4,707,793 A | * | 11/1987 | Anderson ................... 700/188 |
| 4,946,321 A | * | 8/1990 | Allemann ................... 409/132 |
| 4,968,195 A | * | 11/1990 | Hayakawa et al. ......... 409/132 |
| 5,015,130 A | * | 5/1991 | Matsuura et al. ............ 409/80 |
| 5,123,790 A | * | 6/1992 | King .......................... 409/132 |
| 5,134,570 A | * | 7/1992 | Nankaku ................. 318/572 X |
| 5,193,952 A | * | 3/1993 | Tomoo et al. ................ 409/80 |
| 5,223,777 A | * | 6/1993 | Werner ...................... 318/569 |
| 5,297,060 A | * | 3/1994 | Foletti et al. .......... 364/474.02 |
| 5,378,091 A | * | 1/1995 | Nakamura ................... 409/132 |
| 5,406,494 A | * | 4/1995 | Schvett .................... 348/569 X |
| 5,410,489 A | * | 4/1995 | Seki ............................ 700/18 |
| 5,432,704 A | * | 7/1995 | Vouzelaud et al. ... 409/132 UX |
| 5,533,841 A | * | 7/1996 | Iwano et al. ........... 364/474.34 |
| 5,595,463 A | * | 1/1997 | Takegahara et al. ..... 700/193 X |
| 5,847,958 A | * | 12/1998 | Shaikh et al. ................ 700/119 |
| 5,953,233 A | * | 9/1999 | Higasayama et al. ... 318/573 X |
| 6,077,002 A | * | 6/2000 | Lowe .......................... 409/132 |

FOREIGN PATENT DOCUMENTS

| JP | 62-130412 | * | 6/1987 | ................. 409/132 |
| JP | 62-282841 | * | 12/1987 | ................. 409/132 |
| JP | 63-46512 | * | 2/1988 | ................. 700/196 |
| JP | 63-61705 | * | 4/1988 | ................. 409/132 |
| JP | 2-59253 | * | 2/1990 | ................. 409/132 |
| JP | 7-230308 | * | 8/1995 | ................. 409/132 |
| JP | 9-254002 | * | 9/1997 | ................. 409/132 |
| SU | 1000174 | * | 2/1983 | ................. 409/132 |
| SU | 1404201 | * | 6/1988 | ................. 409/132 |

* cited by examiner

Primary Examiner—William Briggs
(74) Attorney, Agent, or Firm—Leydig, Voit & Mayer, LTD

(57) ABSTRACT

A method adapted to achieve a high rate of material removal when, for example, milling a cavity into a work piece. The method includes providing for a cutter path in which the angular engagement between the cutter and the work piece is maintained below a predetermined value to prevent premature wear of the tool, providing for a cutter path which permits a constant cutter feed rate including during directional changes in the path, and machining a series of nested pockets into the work piece utilizing cutter paths as provided for above.

12 Claims, 12 Drawing Sheets

METHOD FOR MACHINING

BACKGROUND OF THE INVENTION

The present invention relates generally to a method for machining a work piece into a predetermined shape. More specifically, the invention relates to a method for high speed CNC (Computer Numeric Control) machining which, while suitable for other purposes, is especially useful for rough milling machine operations where a high rate of material removal is desired.

A typical CNC milling machine includes a table adapted to hold the work piece, a chuck for holding a cutter, and means for selectively moving the cutter in three dimensions or axes to engage and cut the work piece. An electronic controller controls the orientation, path, and speed of the cutter according to a computer control program to machine the desired shape or cut-out in the work piece.

Commercially available CAM (Computer Aided Manufacturing) programs aid a programmer in generating control programs for the CNC machine. The programmer typically either generates a surface model of the desired part or enters dimensions for the finished part into the CAM program. The cutter path is then determined by considering additional data such as cutter sizes, operational characteristics of the machine, and machining characteristics of the work piece material. With the aid of the CAM program, the programmer generates a control program for the CNC machine, defining a cutter path or series of paths for machining the work piece, and the associated cutter feed rate and cutter engagement with the work piece.

Prior methods for milling, for example, a cavity in a work piece, typically consist of programming the machine to take a series of parallel cuts in the work piece, each cut being a predefined depth from the surface of the work piece. The depth of each cut and the speed of the cutter are determined by known methods to maintain the stress in the cutter within an acceptable limit. The cutter then follows a predetermined path to remove the material from the work piece to define the desired cavity to that depth. Typically, the control program is written so that the cutter follows the general shape of the cavity, traveling along a path that moves either outwardly (if starting from the center of the cavity) or inwardly (if starting from the edge of the cavity) upon each pass around the cavity. Alternately, the cutter may travel back and forth across the part, from one edge of the cavity to the other, until the material is removed from that depth of the cavity. The depth of the cutter is then increased in a step-by-step manner, the material being removed at each depth before proceeding to the next cut. In some instances, machining stock may be left on the sides of the machined cavity for a final finish-machining operation.

The cutter drive and control mechanism of a CNC milling machine have an inertia associated with changes in speed, direction, and feed rate. Thus, when the cutter is traveling at a relatively high feed rate, as is typical during high speed machining, the control program generated according to prior machining methods typically reduces the speed of the cutter upon approaching a turn in the cutter path to permit the machine to execute the desired change in direction of the cutter within the acceleration limits of the machine. As a result, the feed rate of the cutter and therefore the rate of material removal is temporarily reduced each time the machine executes a turn according to prior methods. And where the cutter path includes multiple turns, such as when machining a cavity in a work piece, the reduction in overall removal rate may be substantial.

Additionally, it is well known that there is typically an increase in engagement between the cutter and the work piece as the cutter approaches and enters an inside corner or relatively sharp turn in the work piece. Such increase in engagement may result in a relatively large increase in stress or load on the cutter, thereby reducing the machining life of the cutter. Reducing the feed rate of the cutter aids in controlling the stress in the cutter resulting from this temporary increased cutter engagement. Again, however, the rate of material removal decreases as the feed rate of the cutter decreases.

In some instances, the programmer may generate a control program which attempts to generally maintain a constant feed rate as the cutter changes directions. However, even with an especially quick or responsive machine, if the cutter is moving at a relatively high speed, the cutter will typically deviate from the programmed path upon execution of the quick change in direction. Such deviation from the programmed path results in excess stock remaining in unknown or not well defined areas, and in the removal of additional material in other undefined areas. As a result, the engagement and load in the cutter during the next pass of the cutter may increase to an unknown level. These considerations may cause the programmer to provide for a programmed feed rate which is less than optimum to account for the possible increase in load on the cutter.

There is an ever present need to increase productivity of facilities and machinery. Thus, there is a need for an improved method of machining which overcomes the above-identified difficulties and uncertainties in the prior methods of programming for a high speed CNC machining to provide for increased metal removal rates. Specifically, there is a need to provide for high speed machining without overloading the tool and without the need to slow the feed rate upon changing direction of the cutter, thus providing for at a constant cutter feed rate and optimum rate of material removal.

SUMMARY OF THE INVENTION

The general aim of the present invention is to provide a new and improved method of machining which achieves a higher rate of metal removal as compared to prior machining methods of the same general type.

A detailed objective is to achieve the foregoing by providing for a cutter path which will permit the machine to operate at a substantially constant cutter feed rate throughout the machining operation including changes in direction of the cutter path.

Another detailed objective of the invention is to provide for a cutter path which will permit substantially constant angular engagement between the cutter and the work piece, such engagement not exceeding a predetermined value to avoid premature wear of the cutter.

The invention also resides in the novel method for cutting nested pockets in the work piece where a cavity is desired, each pocket generally expanding the size of the opening in three dimensions by a predetermined distance from the desired cavity.

These and other objectives and advantages of the invention will become more apparent from the following detailed description when taken in conjunction with the accompanying drawings.

Figure 1A:
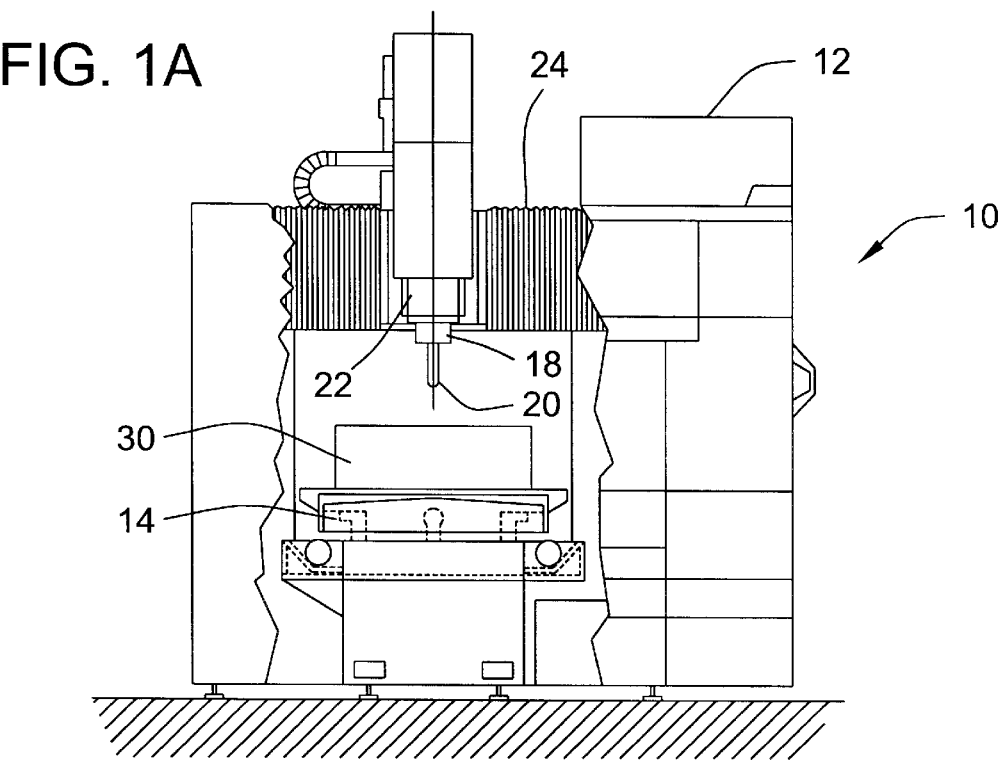
FIGS. 1A and 1B are front and side views, respectively, of a conventional vertical CNC milling machine.

While the invention is susceptible of various modifications and alternative constructions, certain illustrated embodiments have been shown in the drawings and will be described below in detail. It should be understood, however, that there is no intention to limit the invention to the specific forms disclosed, but on the contrary, the intention is to cover all modifications, alternative constructions, and equivalents falling within the spirit and scope of the invention.

DETAILED DESCRIPTION OF THE INVENTION

Figure 1B:
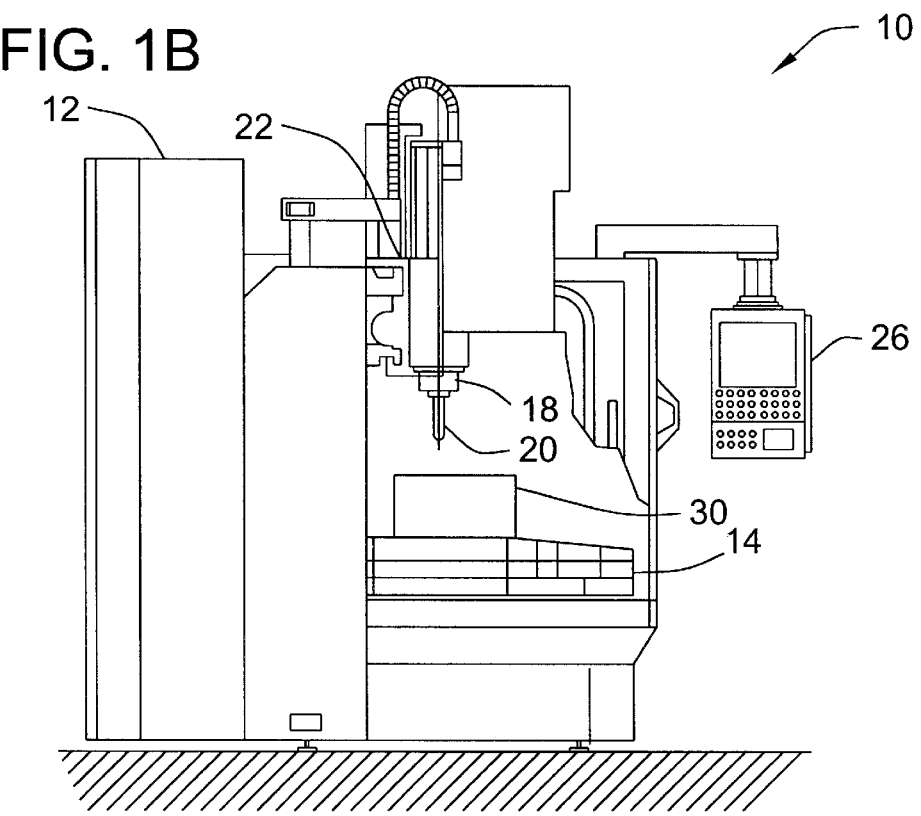

For purposes of illustration, the method of the present invention is shown in the drawings in connection with a conventional vertical CNC milling machine 10 (FIGS. 1A and 1B).

The construction and operation of a conventional CNC milling machine is well known and understood in the art. Briefly, the milling machine 10 includes a frame structure and housing 12, a table 14 movably connected to the frame for supporting a work piece 30, means (not shown) such as hold-down clamps for releasably holding the work piece onto the table, and a power rotated spindle or chuck 18 adapted to releasably hold a cutter 20 for cutting the work piece. The chuck is carried in a head assembly 22 which is connected to a drive and control mechanism 24 for selective movement in three orthogonal axes to effect movement of the cutter.

An operator control center 26 includes an electronic controller which controls machining parameters such as the orientation, path, feed rate, and spindle speed or rotational speed of the cutter 20 in response to a CNC control program, the work piece 30 is then machined according to the instructions in the control program.

Commercially available CAM programs are typically used to generate or aid a programmer in determining operating and machining parameters such as the engagement between the cutter 20 and the work piece 30, and the feed rate and path of the cutter. The CAM program then generates a control program with appropriate instructions for use by the controller for machining the part.

The rate of material removal from the work piece 30 is a function of well known and understood parameters including and of particular interest with regard to the present invention (1) the length and depth of engagement between the cutter 20 and the work piece, and (2) the feed rate of the cutter as it travels along a predetermined path. However, the load or stress on the cutter increases as the engagement and feed rate increase. Therefore, during high speed machining, it is desirable that the milling machine 10 operate at those conditions which optimize the rate of material removal while maintaining the stress in the cutter below a predetermined maximum to prevent premature wear.

The machining method of the present invention contemplates three components to achieve a high rate of material removal. Briefly, these components consist of (1) machining nested pockets into the work piece if a cavity is desired, (2) minimizing the change in feed rate of the cutter as it machines the work piece, and (3) maintaining the angular engagement between the cutter and the work piece below a predetermined value. As applied to various machining conditions and as further described below, these components independently and in combination aid in substantially increasing the material removal rate when compared with prior machining methods of the same general type.

In accordance with one aspect of the invention, when a cavity is desired in a work piece, the cavity is started by first rough-machining nested pockets into the work piece. The cavity is then completed by finish machining the rough-machined cavity to the desired size and shape. Advantageously, machining nested pockets as further described below enables a substantial portion of the material to be removed relatively quickly, reducing the overall time required to machine the desired cavity when compared with prior methods for machining cavities.

Figure 2:
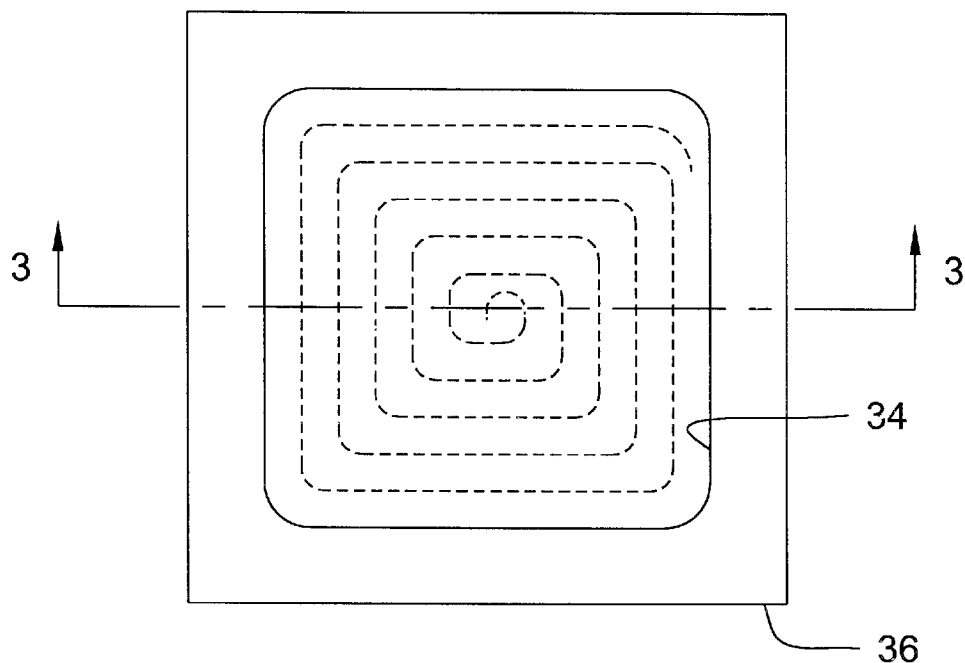
FIG. 2 is a top view of a work piece and illustrating in dashed lines the tool path taken during a prior method of machining a cavity therein.
Figure 3:
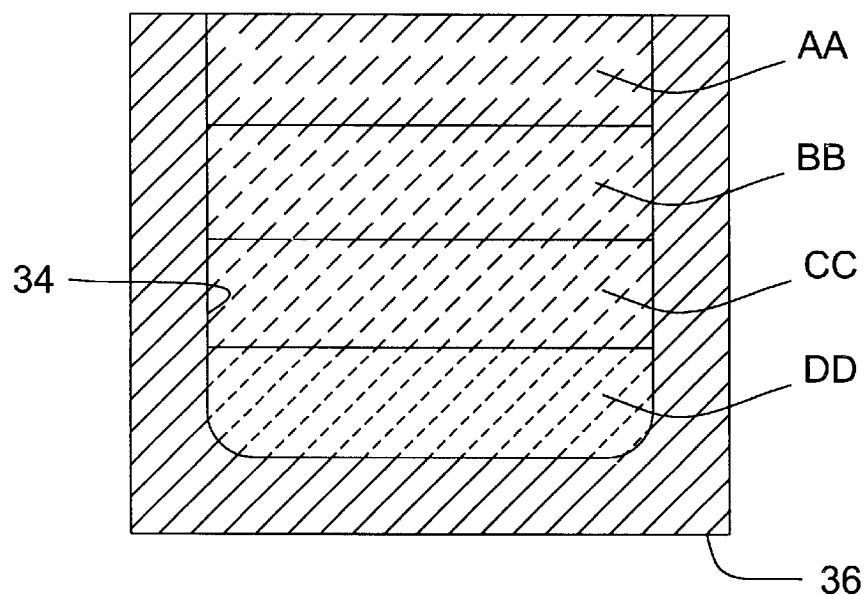
FIG. 3 is a cross-sectional view taken substantially along the line 3—3 of FIG. 2 and illustrating consecutive tool cuts of the prior method.

Prior methods for milling, for example, a cavity 34 (FIGS. 2 and 3) in a work piece 36, typically consist of programming the machine to take a series of parallel cuts such as designated as AA through DD in FIG. 3. In this instance, the cutter is set to a predetermined depth for each cut. The depth of each cut and the speed of the cutter are determined by known methods to maintain the stress in the cutter within an acceptable limit. The cutter then follows a predetermined path to remove the material from the work piece to that depth. Typically, the control program is written so that the cutter follows the general shape of the cavity, traveling along a path that moves either outwardly or inwardly upon each pass around the cavity as generally depicted by the dashed lines in FIG. 2. Alternately, the cutter may sweep back and forth across the part, from one edge of the cavity to the other, until the material is removed from that depth of the cavity. The depth of the cutter is then increased in a step-by-step manner, the material being removed at each depth before proceeding to the next cut.

In carrying out the present invention, the machining of nested pockets includes cutting a series of spaced pockets in the work piece within the material bounded by the desired cavity. Initially, a first pocket is formed in the work piece with a relatively large cutter at a high rate of chip removal to define a rough-machined cavity. Each subsequent pocket enlarges or expands the rough-machined pocket, bringing its surfaces step-by-step closer to the size of the desired cavity. The desired cavity is then completed by finish machining the rough-machined cavity to the desired shape and size. As a result, except for perhaps the final finishing passes of the cutter, a high machining rate can be achieved throughout most of the machining operation.

Figure 4:
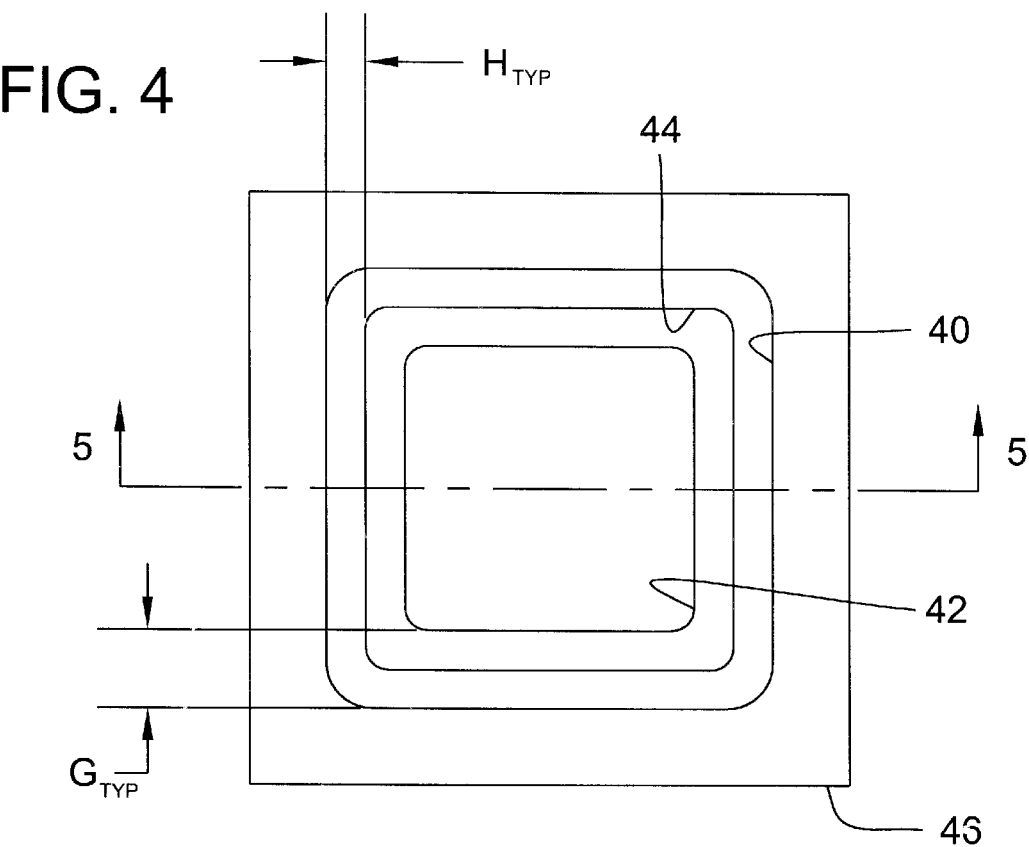
FIG. 4 is a top view of a work piece and showing certain unique aspects of the method of the present invention including nested pockets.
Figure 5:
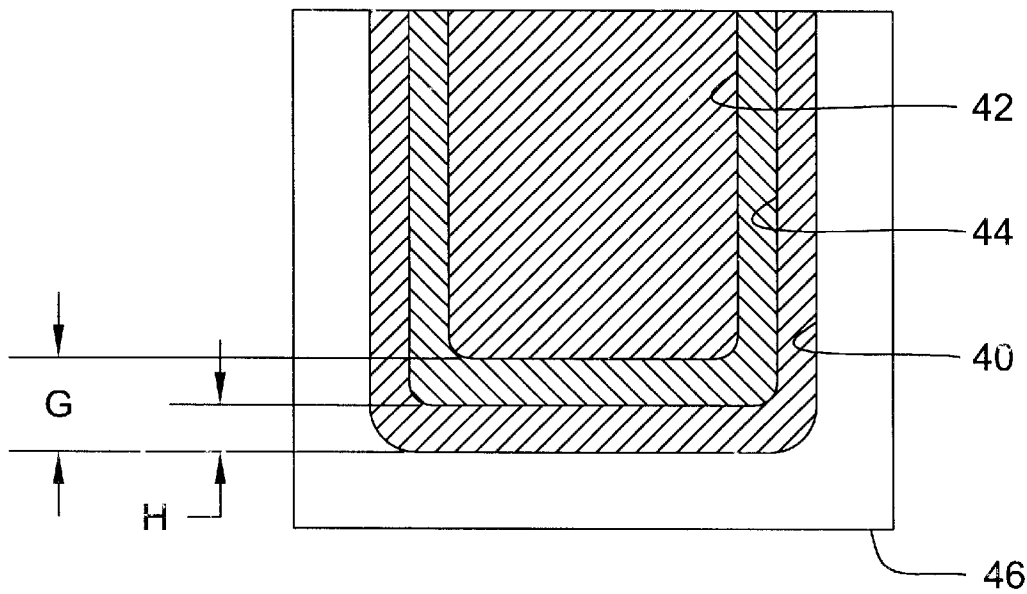
FIG. 5 is a cross-sectional view taken substantially along the line 5—5 of FIG. 4.

For example, if it is desired to machine the cavity 40 of FIGS. 4 and 5, nested pockets 42 and 44 are first machined into the work piece. In this instance, pocket 42 is machined within and generally at a predetermined distance from the desired cavity 40. The pocket 44 is then machined to enlarge the rough-machined-cavity by a predetermined dimension. In the event that additional pockets are machined, each pocket is sized to bring the surfaces of the rough-machined cavity closer to the surfaces of desired cavity.

Advantageously, the inside corners of the pockets 42 and 44 may be formed having radii either larger or smaller than the radii of the inside corners of the desired cavity 40. Permitting such variation in the size of the radii during the rough machining operations allows the nested pockets to be machined with cutters sized to operate at conditions for optimal rate of material removal, including, as further discussed below and pursuant to the invention, operating at a constant feed rate through the corners.

When milling with, for example, a ball-end cutter 20 (cutting edges not shown), the depth "S" and length "L" of engagement between the cutter and the work piece can be defined (see generally FIGS. 6, 7, 8, and 9 ).

Figure 6:
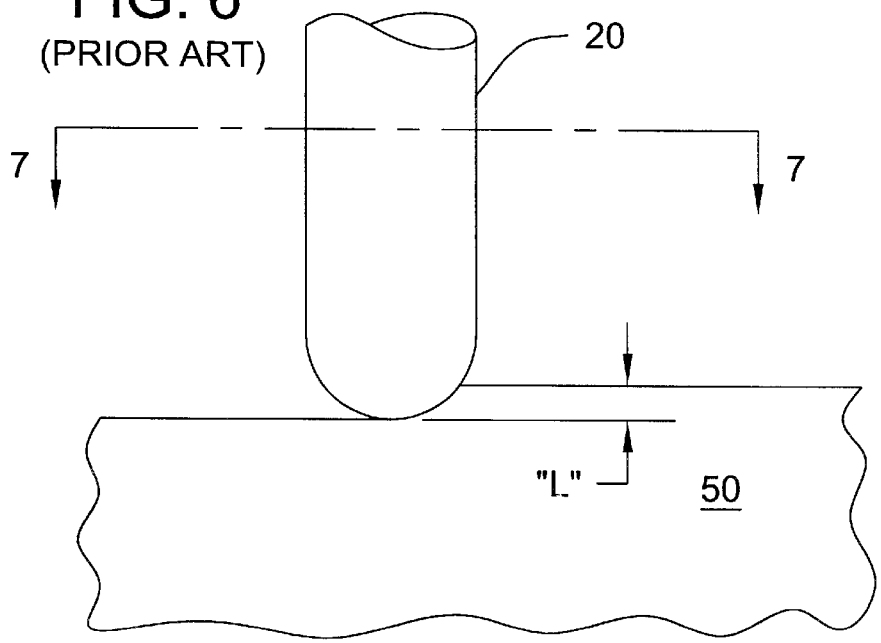
FIGS. 6 and 7 are enlarged fragmentary side and cross-sectional top views of a ball-end milling cutter engaging a work piece according to prior machining methods.
Figure 7:
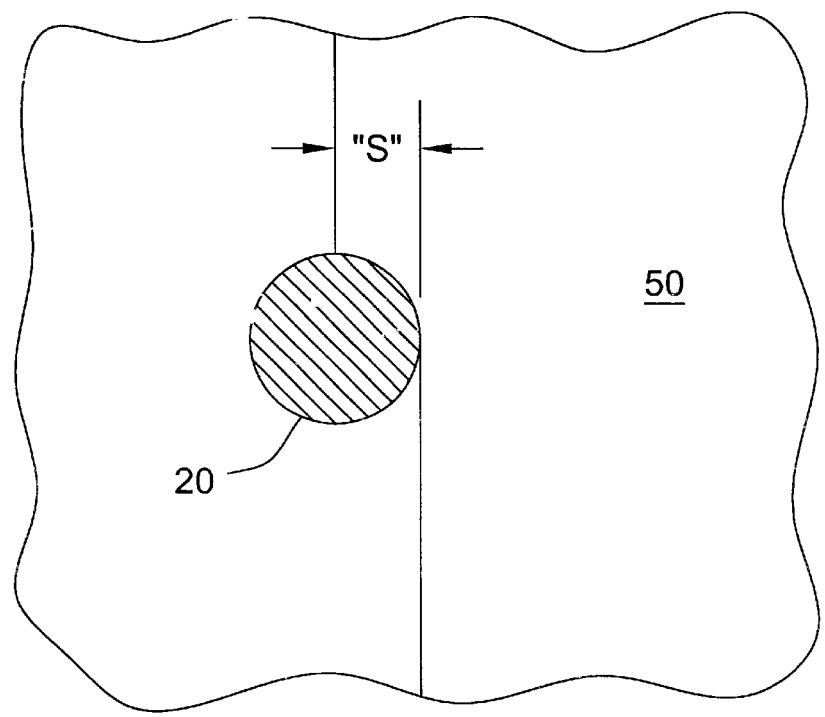
Figure 8:
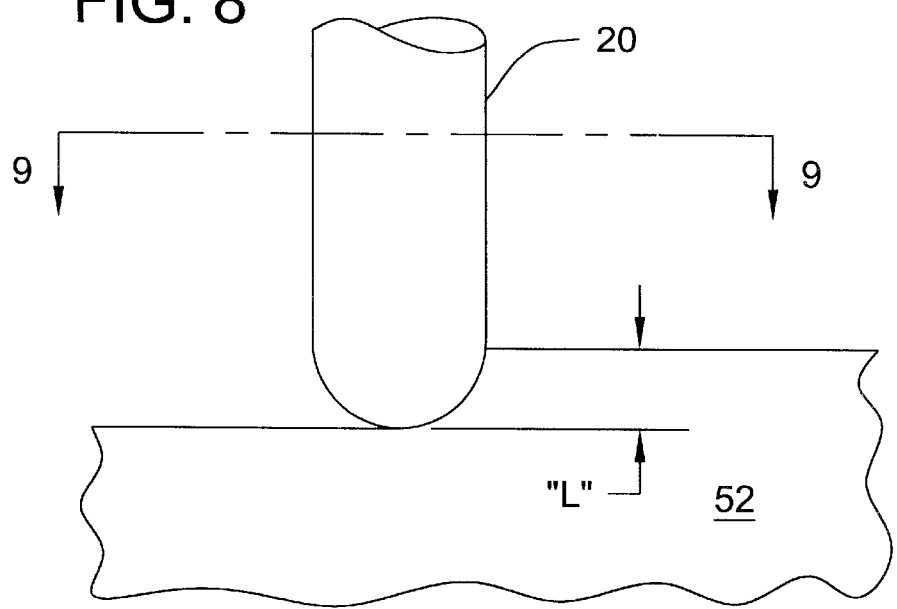
FIGS. 8 and 9 are views similar to FIGS. 6 and 7, respectively, and showing certain unique aspects of the method of the present invention.
Figure 9:
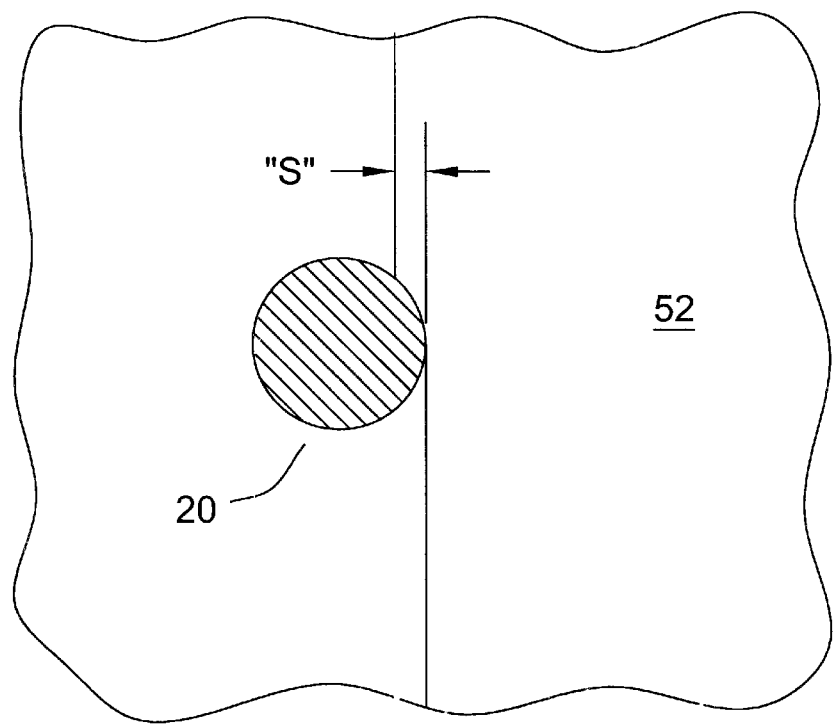
Figure 10:
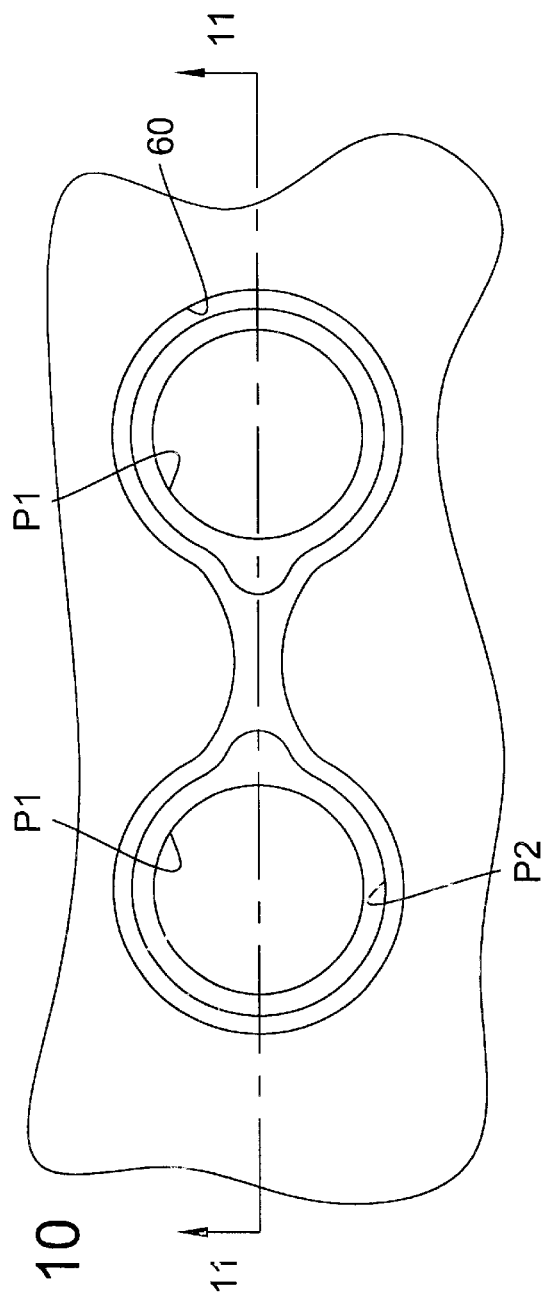
FIGS. 10 through 16 are views similar to FIGS. 4 and 5, and showing consecutive cuts of alternate cavities machined in a work piece.
Figure 11:
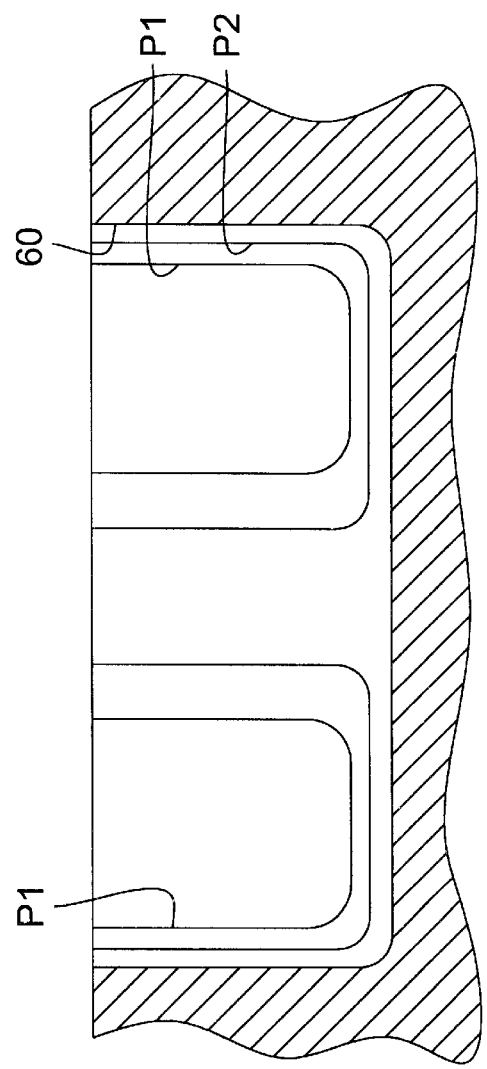
Figure 12:
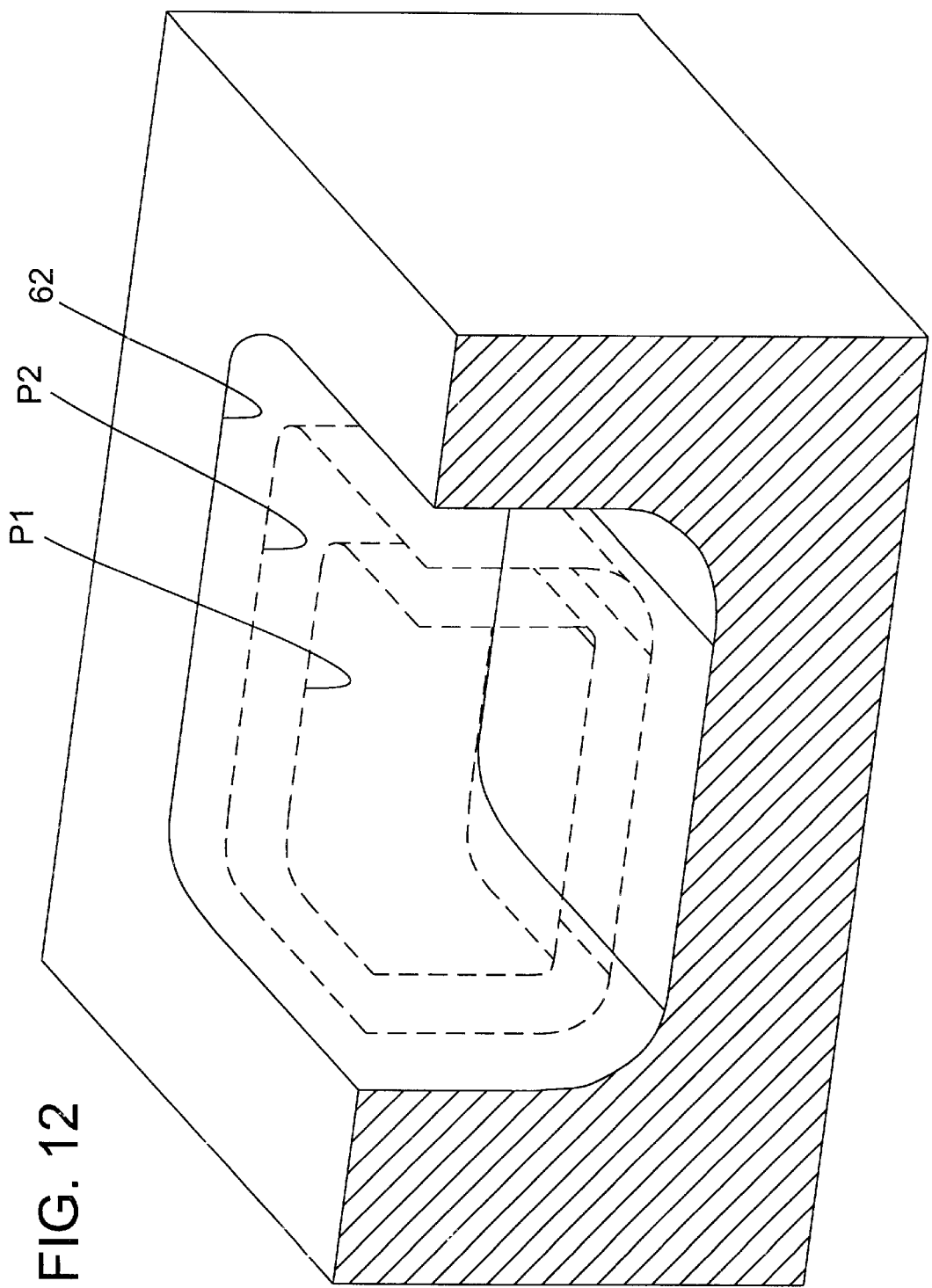
Figure 13:
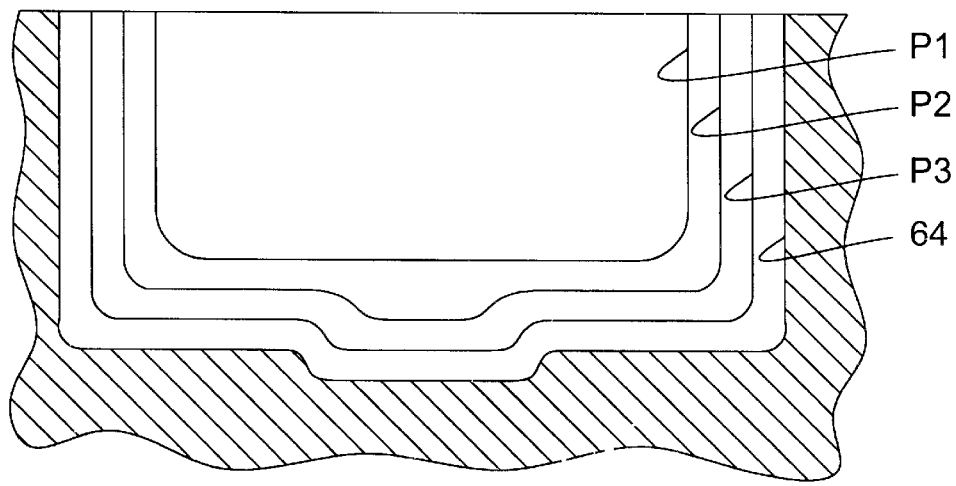
Figure 16:
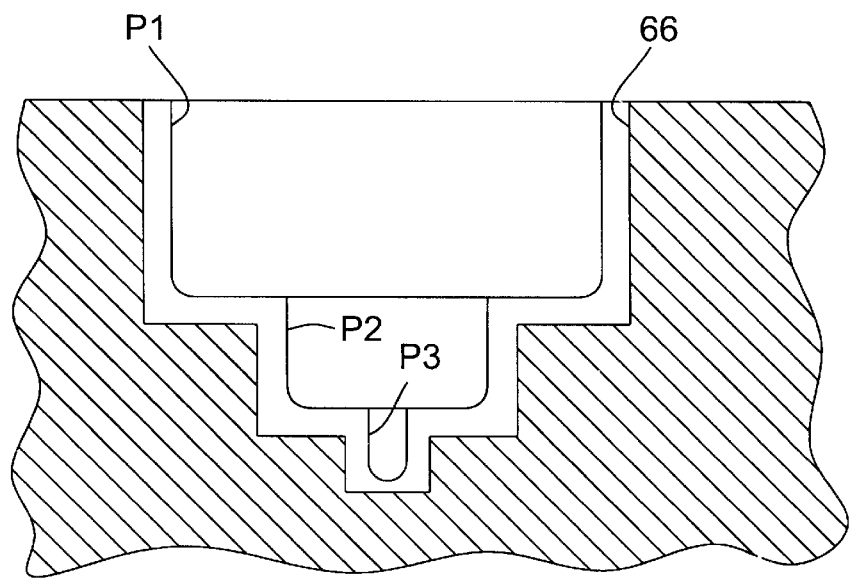

Conventional machining methods utilize only a portion of the radius on the end of cutter, providing for a relatively large depth of engagement "S" and a relatively small length of engagement "L" between the cutter and the work piece (see FIGS. 6 and 7).

In accordance with another aspect of the invention, it has been found that the overall rate of material removal may be increased by (1) reducing the depth of engagement "S" as would generally be recommended according to comparable prior machining methods and (2) increasing the length of engagement "L" between the cutter and the work piece. Advantageously, such a cutting method enables the feed rate of the cutter to be increased above a speed that would normally be recommended according to prior machining methods. As a result, making a full-depth cut approximately equal to the radius of the ball-end cutter (see FIGS. 8 and 9) further increases the overall rate of material removal when machining a work piece.

Accordingly, in a preferred method of the invention, when a cavity is desired, the initial rough-machined pocket is formed with a relatively large ball-end cutter. In this instance, the initial pocket is started by spiraling the cutter into the material to a depth approximately equal to the radius of the cutter, the center of the tool spiraling on a diameter less than the diameter of the cutter such that the outside diameter of the spiral is less than twice the diameter of the cutter. The pocket is then expanded by spiraling the cutter outwardly from the starting or entry cut, each subsequent pass of the cutter expanding the outer edge of the spiraling cut by a distance greater than or equal to the radius of the cutter-but less than the diameter of the cutter. Additionally, the path of the cutter may spiral downwardly from the initial depth of the entry cut to provide for a relatively deep initial rough-machined pocket. Subsequent pockets are formed in a similar manner. Thus, machining large, rough-sized, sequentially increasing pockets, with full-radius depth cuts, prior to a finishing cut to finish the desired cavity, provides for a higher overall rate of material removal when compared with prior methods of machining similar cavities.

The determination as to the size and number of pockets to machine in a work piece prior to finish machining a cavity is based upon a number of factors resulting from material, geometric, and operational constraints including, inter alia, the volume of material that is to be removed, the geometry of the desired cavity, the size of the machine available to cut the pockets, the volume of material common to more than one feasible pocket (e.g., due to height changes), the sizes of tools that are available, and the combination of tools that will optimize the overall material removal rate. The beginning proposition in machining nested pockets according to the invention is to generally utilize the largest cutter which is appropriate to cut the first pocket, considering the depth and width of material available to be cut by the first cutter, and preferably considering the method of making full-depth radius cuts as discussed above.

Figure 14:
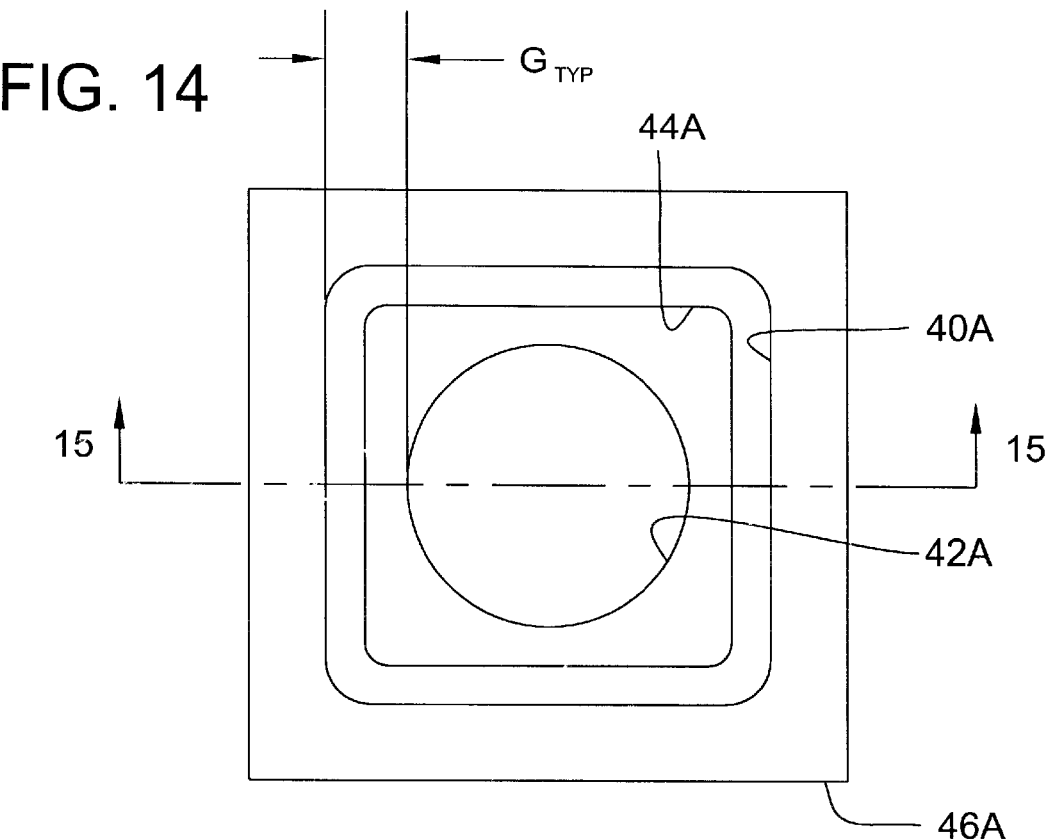
Figure 15:
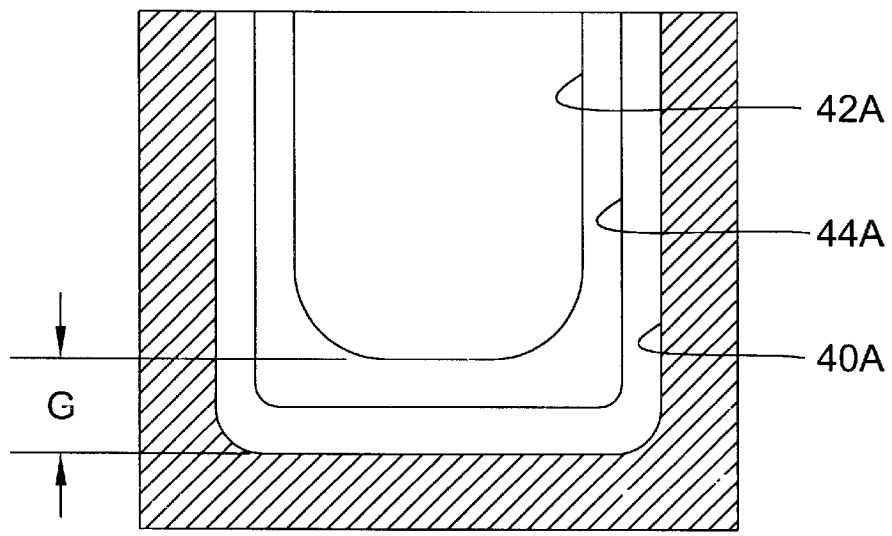

For purposes of further understanding, FIGS. 10 through 16 show various desired cavities 60, 62, 64 66, 68, and,40A, with possible nested pockets (designated generally as P1, P2, etc., indicating order of machining for each pocket) to provide for a relatively high rate of material removal. The pockets shown are not intended to be restrictive as to the configuration of the desired pocket, but are merely illustrative of pockets that might be selected pursuant to the considerations discussed above. For example, FIGS. 14 and 15 show the same sized cavity 40A as cavity 40 (FIGS. 4, 5) but shows the initial pocket 42A as might be formed by a larger diameter cutter than the pocket 42. It should be understood that the present invention is not limited to cavities that have substantially vertical sidewalls, but is equally applicable for cavities having,, for example, tapered or curved sidewalls.

A particular feature of a preferred nested pocket is that the sides of the pocket are spaced from the corresponding sides or boundaries of the subsequent planned pocket or the desired cavity by a minimum distance which is approximately equal relative to all three axes. This provides for maximum material removal when cutting with larger cutters at higher removal rates, provides for a minimum of material for removal by the next cutter, and aids the programmer in accounting for positional inaccuracies due to the high speed rough-machining, especially with regard to larger diameter tools. Therefore, in the work piece 46 (FIGS. 4 and 5), the pockets 42 and 44 are preferably machined so that the sides and bottom of the pockets are generally a distance G and H, respectively, from the respective corresponding surfaces of the desired cavity 40. As a result, the final machining of the cavity 40 may accomplished in a finishing operation with a minimum of material removal.

Using prior machining methods, including those discussed above, a conventional CAM program (or a programmer utilizing conventional CNC programming techniques) may generate a cutter path that includes relatively sharp turns. The resulting conventional CNC control program utilizes a so-called look-ahead function to slow the cutter feed rate as the cutter approaches and travels through such sharp turns. The look-ahead function provides for a tolerance zone through which the cutter travels. However, the tolerance zone results in a not well defined cutter path, leaving excess material in some areas and removing additional material in other areas. In addition, the chip cutting load on the cutter is reduced as the feed rate is reduced. As a result, the cutter may tend to slide against the work piece as it travels through the turn, reducing the life of the cutter. Moreover, since the areas of excess and insufficient material are not well defined, there is the potential that such areas will aggravate premature wear from sliding or overloading the cutter during consecutive cuts.

In accordance with another aspect of the invention, the path of the cutter is generated such that the desired feed rate can be maintained constant, independently of whether there are directional changes in the desired path of the cutter.

More specifically, the cutter path is generated with predetermined minimum turning radii which allow the cutter to change direction without the need to slow from the programmed feed rate. The acceptable minimum turning radius for a particular operation is dependent upon several factors such as the cutter load, the depth of engagement between the cutter and the work piece, the material of the work piece, the diameter of the cutter, the desired feed rate, and the specific machine being used for machining the work piece. Typically, testing will be conducted to determine acceptable minimum turning radii for a set of predetermined machining conditions. In some instances, such performance data may be available from a milling machine manufacturer or from other sources.

In carrying out the invention, either a program may be developed that embodies the machining methods of the present invention for generating the desired cutter paths and feed rates, or a cutter path generated from conventional CNC programming techniques may be modified by (1) locating the portions of the path which result in a directional change that is too great to maintain the desired feed rate (as generally indicated in dashed line 74 in FIG. 17), and then (2) modifying the path such that the specified turning radius 70 (FIG. 17) permits the feed rate in those portions to remain constant at the desired or programmed rate. Specifically, the path is modified to provide a larger turning radius to accomplish the desired directional change of the cutter, so as to maintain the desired or programmed feed rate through the turn without over loading the cutter. Accordingly, a cutter traveling along a path generated by the present invention will proceed at a constant and preferably optimal feed rate and will, therefore, operate at a higher overall rate of material removal.

By way of example, analyzing a conventionally generated cutter path and modifying the path as discussed above enables the cutter to maintain a constant feed rate when machining the corners of the pockets 42 and 44 (FIGS. 4 and 5). In the event that the corners of the cavity 40 require that the feed rate of the cutter be modified due to relatively small desired radii therein, reducing the feed rate of the cutter in these corners will not substantially affect the enhanced removal rate achieved by the invention since the feed rate reduction will only occur during one or perhaps the last few passes of the cutter as it finish machines the corners.

Figure 17:
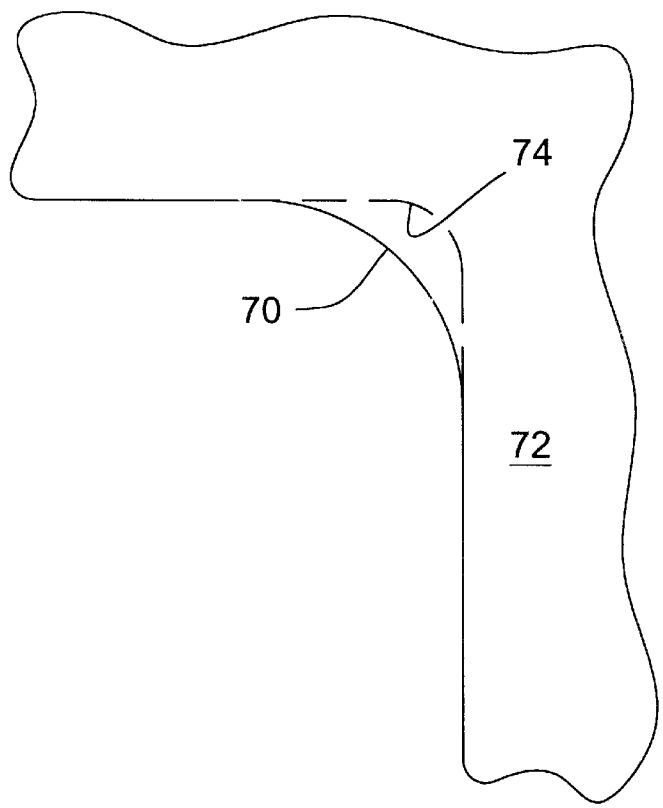
FIGS. 17 through 22D are diagrammatic views illustrating certain unique aspects of the method of the present invention.

It is noted that modifying the inside radius of a cutter path to achieve a constant feed rate for a particular diameter cutter may result in the removal of less material in the corners than prior machining methods (see e.g., FIG. 17). That is, the radius of the resulting surface may be larger than what would be generated from conventional techniques. However, such additional material does not substantially reduce the overall improvement in the removal rate achieved by the present invention. To the contrary, knowing the volume of additional material that is in the corners enables the programmer to account for this material during the next pass of the cutter and operate the cutter at optimum conditions. Thus, the present invention enables the programmer to provide for a constant feed rate, insure that the chip load on the cutter remains relatively constant, and thus reduce the possibility of tool burn or premature wear in the corners.

Figure 18:
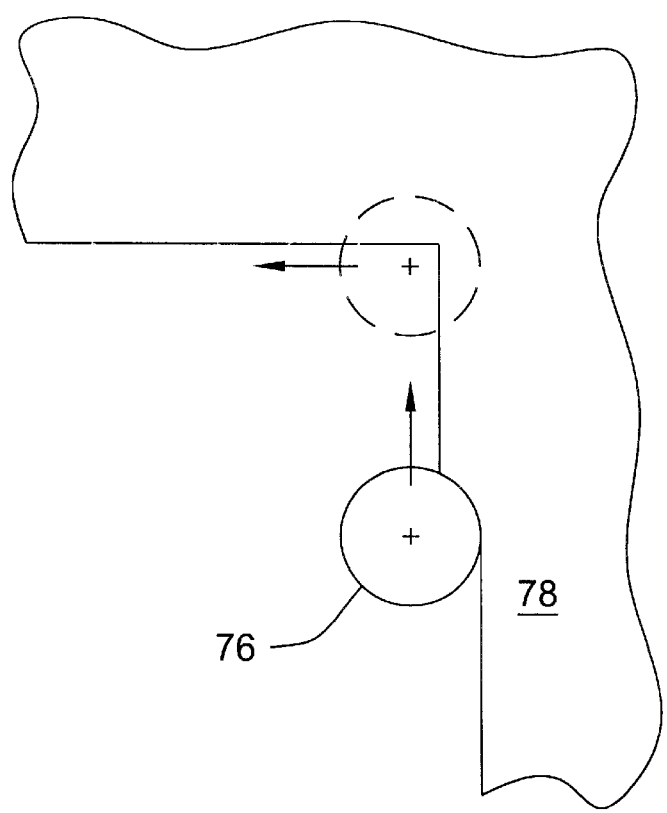
Figure 19:
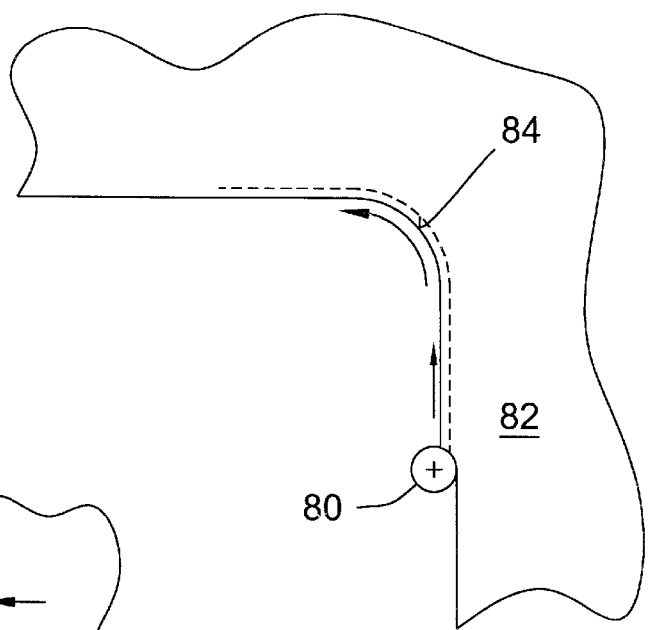

As previously indicated, the present invention is especially suitable for use in rough-machining operations since, for a predetermined tool size, the minimum turning radius which allows a constant feed rate may be larger than the minimum turning radius provided for via conventional machining methods. However, the methods of the present invention will under certain circumstances be equally suitable for use in finish machining operations. For example, if it is desired to turn sharply a 1 inch radius cutter 76 (FIG. 18) to achieve a 1 inch internal radius in the work piece, the cutter speed will need to be slowed to execute the turn and to prevent cutter overload due to the increased engagement as the cutter approaches the corner as shown in dashed lines in FIG. 18. Alternately, if a 1 inch internal radius is to be formed in the work piece, such a radius may be formed with a cutter having a radius that is somewhat smaller than 1 inch, enabling the cutter to form the desired radius in the material while changing direction or turning on a substantially larger radius. Thus, for example, if a machine is able to execute a ⅛ inch radius turn with a ¼ inch diameter cutter 80 (FIG. 19) at the desired feed rate, the overall feed rate of the finish cutter can be maintained constant while finish machining the work piece 82 including the desired 1 inch inside radius 84.

Figure 20:
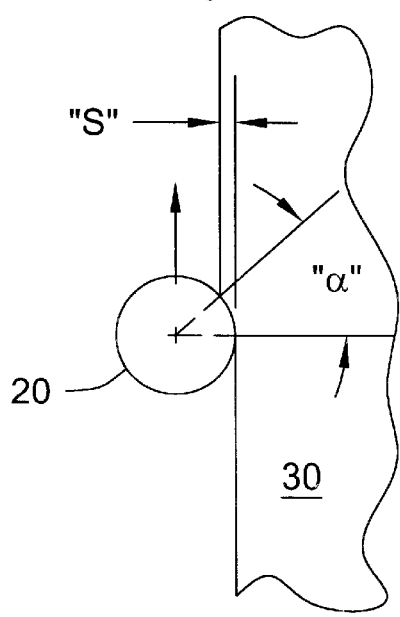
Figure 21:
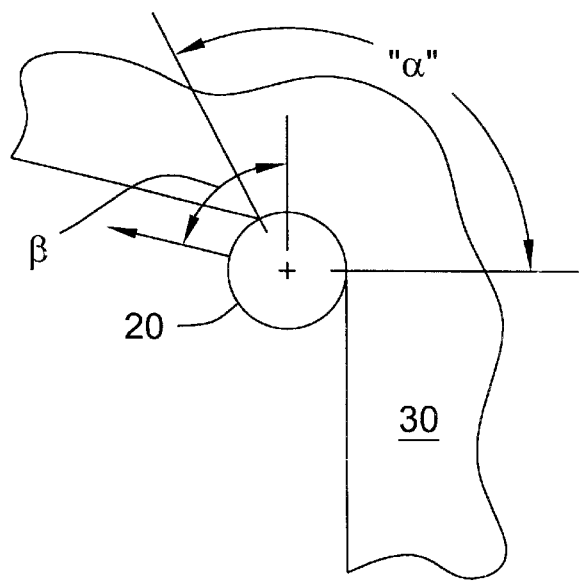

As shown in FIG. 20, there is an angle of cutter engagement "α" between the point of entry of the cutting edge into the material of the work piece 30 and the point of exit of the cutting edge from the work piece. If the cutter 20 is executing a sharp turn (see FIG. 21), α is equal to $[\cos^{-1}(1-S/R)+\beta]$ where α and S are as defined above, R is the radius of the cutter, and β is the angle of directional change. Therefore, if the cutter is traveling along a straight path, β=0, and α is equal to $[\cos-1(1-S/R)]$. As is apparent, the angular engagement α increases as the cutter executes a turn (see also FIGS. 22A, 22B, 22C, 22D and as further discussion below).

Advantageously, it has been found that there is a maximum value for α, "α-max", which generally corresponds to a predetermined tool life. This enables determination of an optimized cutter path during which α does not exceed α-max and enables determination of minimum permissible turning radii of the cutter to achieve the desired tool life as well as the desired constant cutter feed rate.

In accordance with still another aspect of the invention, the diameter of the cutter and the cutter path are determined or selected such that the angular engagement α does not exceed a predetermined angular engagement α-max through out the cutting path.

Since the life of a tool is generally dependent upon cutter load, the desired life of a tool for use in a particular machining operation will depend on which parameter, such as long life, volume of material removal (resulting in a shorter acceptable life), or overall tool cost, is of interest during that machining operation. Thus, α-max can be determined by conducting cutter wear tests as per the desired machining operation such as with the type of cutter of interest, with the work piece material of interest, at the desired spindle speed, and at the desired cutter feed rate until an α-max is established that results in the desired life of the tool. It should be apparent that α-max is generally greater for cutters intended for use in rough machining where the volume of materials of primary importance than for finishing cutters where it is desirable to reduce the chip load to insure cutting accuracy and a better surface finish.

For illustrative purposes only, testing and experience have determined the following approximate values for α-max for certain rough machining operations:

| Material of Work Piece | Cutter Diameter | Cutter Coating | α-max |
| --- | --- | --- | --- |
| H13 Steel | 1 inch | Titanium Nitride | 19 degrees |
| P20 Steel | 12 mm | Titanium Nitride | 22 degrees |

Several factors affect the actual value of α for a particular machining operation. Specifically, α generally decreases as the diameter of the cutter increases, as the stock removal rate increases, and as the sharpness of the cutter turn increases.

Figure 22A:
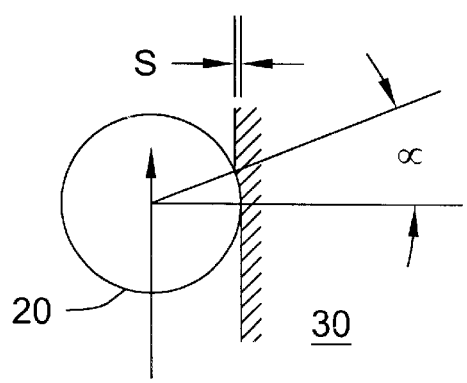
Figure 22B:
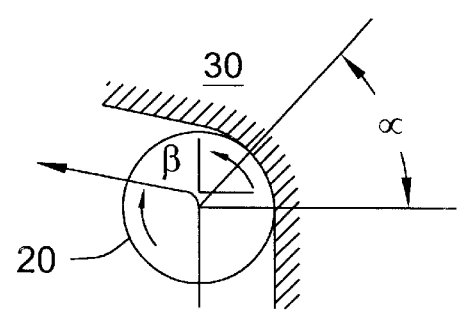
Figure 22C:
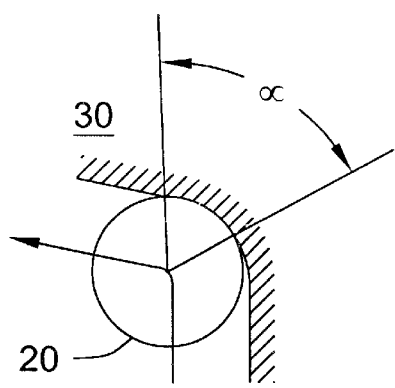
Figure 22D:
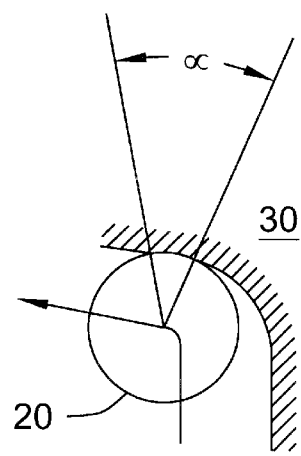

FIGS. 22A–22D illustrate sequentially the change in the angular engagement a as a tool approaches a turn (FIG. 22A) enters into the turn (FIG. 22B), nears the exit of the turn (FIG. 22C), and then proceeds past the turn (FIG. 22D). Insuring that the actual angular engagement a does not exceed the maximum permissible angular engagement α-max is then provided for by analyzing a possible cutter path to determine if the resulting engagement a exceeds the desired α-max anywhere in the path and, if necessary, changing parameters such as the cutter diameter or the cutter path so that α remains less than α-max. A possible cutter path may be generated by a conventional CAM program or by a program that embodies the methods of the present invention.

With a predetermined cutter path and a predetermined depth of engagement, it may be possible to choose a cutter diameter which allows for a path radius which would not result in the angular engagement α exceeding the maximum permissible engagement α-max. In other words, α-max will not be exceeded by a cutter traveling on the predetermined path if the minimum allowable turning radius corresponding to α-max for the cutter chosen is less than or equal to the minimum turning radius of the predetermined path.

For example, if α-max is determined to be equal to 25 degrees, and the angle of engagement α in the predetermined path is equal to 16 degrees, an increase in angular engagement of 6 degrees is available for executing a change in direction without affecting the predetermined acceptable tool life. Thus, a cutter of a predetermined diameter will be acceptable of the cutter can execute the sharpest turn in the path without resulting in an increase in angular engagement greater than 6 degrees.

It is noted that for a predetermined path radius and depth of engagement "S", the engagement a of the cutter decreases as the diameter of the cutter decreases, providing for additional angular engagement α with which to execute a desired turn. However, the decision as to whether a small enough cutter may be chosen to meet the α-max angular engagement parameter will likely by dependent upon the minimum allowable cutter size as determined by other operating parameters such as the desired feed rate and the desired depth of engagement.

If the above technique of selecting a cutter of a suitable diameter can not be successfully utilized, i.e., if the smallest permissible cutter traveling through the predetermined minimum path radius would result in engagement α exceeding the predetermined α-max, the path may be modified as discussed above to increase the minimum radius in the path until α no longer exceeds (α-max for a predetermined cutter diameter as the cutter travels through that modified radius. As a result, turning radii in the path are increased and the material removal in the radius is reduced to reduce the actual engagement α in the turns to within an acceptable limit. The additional material that is left in the radius as a result of this modification is known and can be removed during a subsequent pass of the cutter.

Continuing with the above example, with a predetermined cutter, an angular engagement α equal to 16, and the desired α-max equal to 25, the desired change in direction of the tool can be accomplished while maintaining α within α-max by executing the change in direction with a series of sequential turns such that β in each turn is less than or equal to $[(\alpha\text{-max})-\cos^{-1}(1-S/R)]$. Utilizing known techniques, an equivalent turning radius can then be determined to execute this series of turns, thus, providing for the desired directional change in the path of the cutter while maintaining the total angular engagement less than 25 degrees pursuant to the invention.

It should be apparent to one skilled in the art that determining the optimal cutter path (1) including the depth of cutter engagement "S" to provide for a constant feed rate, and (2) to provide for angular engagement α that is less than α-max for certain machining conditions is typically an iterative process. It should also be apparent that the determination as to the angular engagement α with regard to the radius of the cutter, and the permissible angular engagement α-max to avoid premature wear, apply equally to both the side of a cutter and the end of a ball-end cutter.

From the foregoing, it will be apparent that the present invention brings to the art a new and improved machining method for enhanced high-speed material removal rates, and which provides the CNC programmer with a set of guidelines to aid in programming a CNC machine for same. Generating a cutter path according to the invention provides for a constant feed rate and high rate of material removal while insuring against premature wear of the cutter operating under such high-speed machining conditions, and thus, further contributing to the overall material removal rate by reducing downtime of the machine. Moreover, by machining nested pockets prior to finish machining a desired cavity, the increase in the rate of material removal is further enhanced.

I claim:

1. A method adapted for use with a CNC machine for machining parts to a desired size and shape from a work piece, said machine having a power rotated cutter and control means for moving said cutter in three orthogonal directions, said method comprising the steps of:

(A) selecting a first cutter having a diameter for cutting the work piece;

(B) establishing a minimum life for said selected cutter;

(C) establishing the maximum permissible continuous angular engagement between said selected cutter and said work piece to enable said selected cutter to achieve said minimum life;.

(D) generating a cutter path for machining said work piece to proximate said desired size and shape with said selected cutter;

(E) determining the maximum angular engagement between said selected cutter and said work piece as the cutter travels through said path;

(F) identifying those portions of said path in which the angular engagement exceeds said maximum permissible angular engagement;

(G) if such portions are identified, selecting one of (i) increasing the minimum turning radius in those identified portions of the path to define a modified cutter path such that the angular engagement therein does not exceed said maximum permissible angular engagement or (ii) selecting a second cutter having a diameter less than said first cutter and repeating said establishing, generating, determining, and identifying steps and this step until no such portions are identified;

(H) rough-machining the part utilizing the cutter path and cutter resulting from said selecting, establishing, determining and identifying steps; and (I) finish-machining the part to the predetermined size and shape.

2. A method as defined in claim 1 in which the cutter used in said rough-machining step has a radius less than the minimum turning radius of the cutter path of said rough-machining step.

3. A method as defined in claim 2 in which said rough-machining and said finish-machining steps are accomplished simultaneously.

4. A method as defined in claim 1 in which the cutter used in said rough-machining step is a ball-end cutter, and in which said rough-machining step includes machining a full-depth radius cut with said ball-end cutter.

5. A method adapted for use with a CNC machine for machining parts to a desired size and shape from a work piece, said machine having a power rotated cutter and control means for moving said cutter in orthogonal directions, said control means being limited to a minimum turning radius through which said means is capable of maintaining a constant cutter feed rate, said method comprising the steps of:

(A) generating a cutter path for a first cutter having a diameter for machining the work piece;

(B) identifying those portions of said cutter path through which the machine is incapable of maintaining a constant cutter feed rate;

(C) increasing the minimum turning radius in those identified portions of the cutter path to a radius at least equal to said minimum turning radius of said control means so as to define a modified cutter path and to enable the machine to maintain a constant feed rate therethrough;

(D) rough-machining the part utilizing the modified cutter path; and (E) finish-machining the part to the desired size and shape.

6. A method as defined in claim 5 further comprising the steps of (F) selecting a second cutter having a diameter less than the diameter of said first cutter, and (G) further modifying said modified cutter path to enable simultaneous rough-machining and finish-machining of the work piece.

7. A method as defined in claim 5 in which the radius of said first cutter is less than the minimum turning radius of said modified path.

8. A method as defined in claim 5 in which said cutter is a ball-end cutter, and in which said rough-machining step includes machining a full-depth radius cut with said cutter.

9. A method adapted for use with a CNC machine for machining arts to a desired size and shape from a work piece, said machine having a power rotated cutter and control means for moving said cutter in orthogonal directions, said method comprising the steps of:

(A) selecting a first cutter for cutting the work piece;

(B) establishing a cutting life for said first cutter;

(C) determining a maximum continuous angular engagement between said first cutter and the work piece consistent with achieving said cutting life;

(D) generating a desired cutter path having minimum turning radii consistent with achieving said maximum continuous angular engagement for machining said work piece to proximate said desired size and shape.

10. A method as defined in claim 9 in which said generating step includes the steps of (i) generating a first cutter path, (ii) determining the maximum angular engagement between said first cutter and said work piece as the cutter travels through said first cutter path, (iii) identifying those portions of said first cutter path in which the angular engagement exceeds said maximum permissible angular engagement, and (vi) if such portions are identified, increasing the minimum turning radius in those identified portions of the path to define said desired cutter path.

11. A method as defined in claim 9 in which said generating step includes the steps of (i) generating a first cutter path, (ii) determining the maximum angular engagement between said first cutter and said work piece as the cutter travels through said first cutter path, (iii) identifying those portions of said first cutter path in which the angular engagement exceeds said maximum permissible angular engagement, and (vi) if such portions are identified, (a) selecting a second cutter having a diameter less than said first cutter and (b) repeating said determining and said generating steps to define said desired cutter path.

12. A method adapted for use with a CNC machine for machining parts to a desired size and shape from a work piece, said machine having a power rotated cutter and control means for moving said cutter in orthogonal directions, said method comprising the steps of:

(A) establishing a feed rate and engagement for said cutter when machining the work piece;

(B) determining a minimum cutter path turning radius consistent with achieving said feed rate and engagement;

(C) generating a cutter path having turning radii consistent with said minimum cutter path turning radius for achieving said feed rate and engagement substantially constant throughout machining of the work along said cutter path;

(D) rough-machining the part utilizing said cutter path; and (E) finish-machining the part to the desired size and shape.

* * * * *